Patented Oct. 3, 1933

1,929,331

UNITED STATES PATENT OFFICE 1,929,331

PROCESS FOR THE PRODUCTION OF KETONES

Wilhelm Querfurth, Constance, Germany, assignor, by mesne assignments, to the firm of Deutsche Gold- und Silber-Scheideanstalt vormals Roessler, Frankfort-on-the-Main, Germany No Drawing. Application January 7, 1930, Serial No. 419,209, and in Germany January 25, 1929

7 Claims. (Cl. 260—134)

The invention relates to the production of ketones, particularly acetone, by the action of water vapour on ketonizable bodies in the presence of catalysts. The fundamental idea of the invention resides therein that strong exothermic ketonizing reactions, as for example the conversion of acetylene into acetone, are combined with other ketonizing operations which are not exothermic but preferably require the application of heat.

When ketonizing acetylene according to the formula

$$2C_2H_2 + 3H_2O = (CH_3)_2CO + CO_2 + 2H_2$$

for example about 80 calories per molecule of acetone formed are released. It is, therefore, necessary for the purpose of obviating deleterious overheating to take special precautions for rendering the heat developed non-injurious.

When ketonizing ethyl alcohol according to the formula

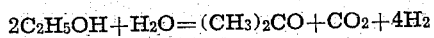
$$2C_2H_5OH + H_2O = (CH_3)_2CO + CO_2 + 4H_2$$

there are required about 20 calories per molecule of the acetone formed. The necessary temperature must consequently be maintained by constant heating of the catalyst chamber.

It has now been found that it is possible to combine strong exothermic ketonizing of acetylene with the endothermic ketonizing of ethyl alcohol by subjecting mixtures of acetylene and ethyl alcohol with water vapour to a reaction. By adjusting the proportions of mixing it is possible to set the heat balance to a suitable value between 80 calories and −20 calories. For example the operation must be such that a slight excess of heat is available which is sufficient for compensating losses due to radiation and conduction. This requirement would for example be satisfied by proportions of mixing of 1 molecule acetylene to 3 molecules ethyl alcohol. The operation may, however, be also carried out with other proportions of amounts, for example with larger quantities of acetylene should this be desirable.

Further investigations have shown that other ketonizing processes which are not exothermic and are effected by the co-operation of water vapour, as for example the ketonizing of aldehydes, such as acetaldehyde (±0 calories), of acids such as acetic acid (−17 calories) of esters, as for example ethyl acetate (−12 calories), may be combined with exothermic processes as for example the ketonizing of acetylene. It is also possible to subject mixtures of substances, which contain a number of ketonizable substances, such as for example ethyl alcohol, acetaldehyde, acetic acid, ethyl acetate, as occur in the art, to a common ketonization with initial substances which can be ketonized exothermally. The ketonizing process may also be carried out in the presence of substances which do not partake in the reaction, as for example methyl alcohol.

Finally it has also been found that ketonizable compounds with more than 2 C-atoms, as for example n-propanol, butyraldehyde and the like, can be ketonized together with initial substances as for example acetylene. In this manner it is possible also to produce mixed ketones.

As catalysts there are preferably used oxygen compounds of heavy metals, especially of iron, which are capable of causing the water used to react with the ketonizable bodies. These catalysts are preferably used in combination with additional substances (auxiliary catalysts) which improve the activity thereof and prolong the duration of their action. As additional substances there may be considered amongst the actual catalysts various metal oxygen compounds, such as for example aluminium oxide, barium carbonate, zinc carbonate, nickel oxide, lime, magnesia and the like, and further also metals themselves. With particular advantage there are used combinations of actual catalysts as for example iron-oxygen compounds, oxygen-containing auxiliary catalysts, for example barium carbonate, and metals, for example metallic iron. There may for example be used combinations of actual catalysts such as oxides of iron, manganese, uranium, tungsten, molybdenum and oxygen-containing additional substances on metal carriers, for example in such a manner that superficially oxidized iron, for example in the form of rusty iron shavings, is provided with a thin layer of oxygen-containing additional substances as for example manganese oxide, zinc oxide, nickel oxide or the like.

Metal-oxygen compounds occurring in nature such as ores and the like may be used alone or after being mixed with suitable additional substances as mixed catalysts which are well suited for the formation of acetone.

The working temperatures may be kept within comparatively wide temperature limits, for example between 250 and 750° C. In general it has been found of advantage to operate between 350 and 650° C., preferably between 400 and 550° C.

The proportions of the amounts between ketonizable bodies and water vapor may also fluctuate between considerable limits for example in such a manner that for one part by volume of ketonizable gas, vapors or gas-vapor mixtures there are used 2 to 20 parts by volume, preferably 5 to 15 parts by volume of water vapor.

The process produces yields up to 90% and more of the theoretical amount. The successful carrying out of the process is surprising. It was not anticipated that exothermic and endothermic ketonizations could be effected successfully simultaneously under the same conditions of operation, for example as regards degree of temperature, speed of flow of the reaction gases and so forth.

Example

A mixture of 1624 kg ethyl alcohol and 1008.7 cubic metres (0° 760 mm) acetylene are passed with 18100 kg water vapor at 470° C. over a contact consisting of rusty iron sponge with an addition of 3% manganese oxide. There are obtained 1942 kg acetone together with 265 kg unchanged ethyl alcohol. The yield, calculated both upon ethyl alcohol consumed and the acetylene used, amounts to 89,1% of the theoretical amount.

The above process can be used with particular advantage when mixtures of the character above referred to occur in the course of a producing operation. For example in the production of acetaldehyde there is obtained by the deposition of water on acetylene a gas-vapor mixture consisting of non-decomposed acetylene and acetaldehyde together with small quantities of water vapor and acetic acid. After removal of the major portion of the acetaldehyde by condensation or washing and after the addition of water vapor this mixture may be used as the initial material for the production of acetone in accordance with the invention. The yield amounts to 90% and more. It will be understood that the mixture obtained may also be ketonized without previous separation of the acetaldehyde by the addition of water vapor if this appears advantageous for any reason.

I claim:

1. A process for the production of ketones by reacting a mixture of ketonizable substances and water vapor at high temperatures, the mixture including acetylene and a substance which ketonizes endothermically selected from the group which consists of ethyl acetate, ethyl alcohol, acetaldehyde and acetic acid, in the presence of a catalyst comprising essentially an oxide of a heavy metal.

2. A process as set forth in claim 1, wherein the ketonizable substances are admixed in such proportions and amounts that the thermal balance after the process has started is maintained at substantially zero.

3. A process as set forth in claim 1, wherein the mixtures of ketonizable substances are reacted in the presence of water vapor at temperatures within the range of 250° C.–750° C.

4. A process as set forth in claim 1, wherein the catalyst contains an auxiliary material of catalytic activity comprising an oxide of a metal selected from the group which consists of aluminum, barium, zinc, nickel, calcium, magnesium, and manganese.

5. A process as set forth in claim 1, wherein the catalyst contains an auxiliary material of catalytic activity which comprises an oxide of a metal selected from the group consisting of aluminum, barium, zinc, nickel, calcium, magnesium, and manganese deposited on a carrier.

6. A process as set forth in claim 1, wherein the catalyst contains barium carbonate as an auxiliary catalytic agent.

7. A process for the production of ketones by reacting a mixture of ketonizable substances and water vapor at high temperatures, the mixture including acetylene and a substance that ketonizes endothermically, said substance being selected from the group which consists of ethyl acetate, ethyl alcohol, acetaldehyde and acetic acid, in the presence of a catalytic mixture comprising essentially iron oxide and manganese oxide.

WILHELM QUERFURTH.